Nov. 10, 1936.  F. J. HITCHCOCK ET AL  2,060,372

OIL BOTTLE SILENCER CAP

Filed June 12, 1934

INVENTORS

George G Perkins
Frederick J Hitchcock

Patented Nov. 10, 1936

2,060,372

UNITED STATES PATENT OFFICE 2,060,372

OIL BOTTLE SILENCER CAP

Frederick J. Hitchcock, Danvers, and George G. Perkins, Lynn, Mass.

Application June 12, 1934, Serial No. 730,272

2 Claims. (Cl. 137—68)

Our invention relates to oil-burner apparatus and other systems which include a vacuum-liquid reservoir which discharges the liquid by gravity into a trap vessel.

In the case of oil burner apparatus for domestic use the reservoir referred to is commonly a glass bottle supported in an inverted position with its mouth normally submerged in, and closed to the entrance of air by, a body of oil within a trap or vessel that is connected by a pipe with the burner of the apparatus so that oil is fed by gravity from the trap to the burner as it is consumed by the latter.

When the level of the oil within the trap falls below the mouth of the bottle air is admitted to the latter thereby permitting oil to descend from the bottle by gravity into the trap so that the level of the oil contents of the latter is raised again thus closing the mouth of the bottle to the entrance of air and stopping the movement of oil from the bottle to the trap.

In most cases the entrance of air and the discharge of the liquid into the trap vessel is accomplished by a gurgling and very annoying sound, which is quite audible for considerable distance. This noise is very objectionable for several obvious reasons.

Our invention has for its main object to make the reservoir discharge quiet and at the same time to regulate the air entering the reservoir so that it will be gradual and thus maintain a constant level in the lower trap vessel.

To these ends we have provided an apparatus of the class indicated having the peculiar features of construction and mode of operation set forth in the following description, the several novel features of the invention being separately pointed out and defined in the claims at the close thereof.

In the accompanying drawing:

Figure 2 is a cross section of a bottle cap hereinafter referred to.

Figure 2:
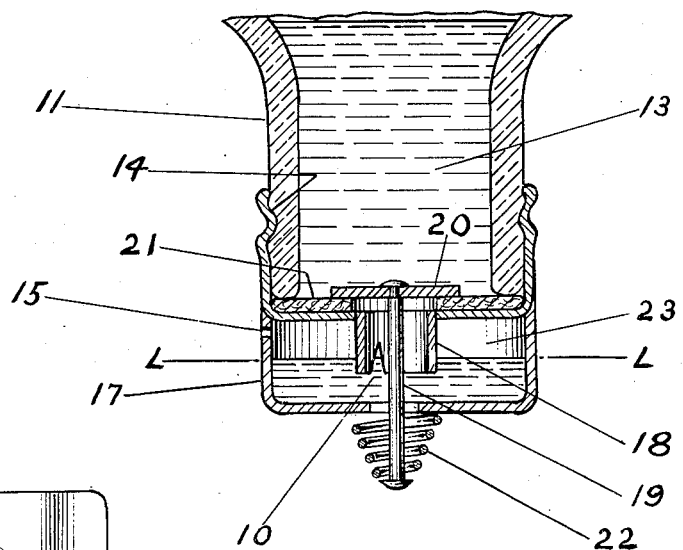
Figure 1:
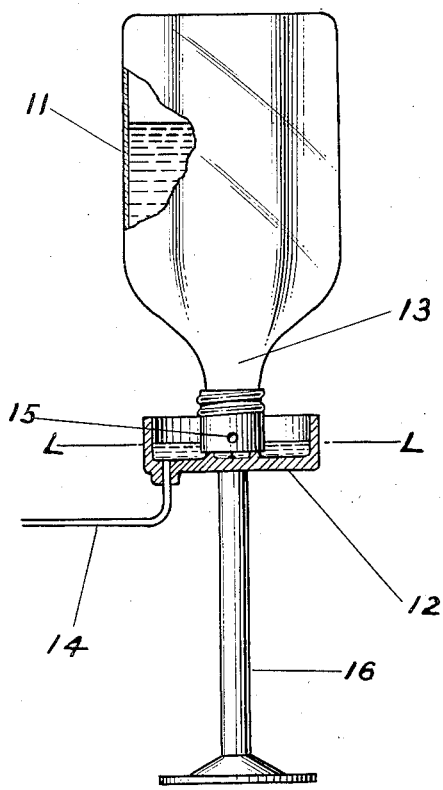
Figure 1 is a diagrammatic view showing the major portion of an oil burner apparatus embodying one form of our invention.

Our invention is herein illustrated as embodied in an oil burner apparatus for domestic use.

A supply of fuel oil is contained within an inverted glass bottle 11 which usually has a capacity of about two gallons. Oil is delivered automatically and intermittently from this supply bottle 11 into a trap 12 having an outlet at its bottom that is connected by a pipe 14 with the burner of the apparatus. The oil is delivered by gravity from the bottle 11 into the trap 12 and flows by gravity from the trap 12 to the burner. The stand 16 is for holding the trap 12 which in turn holds the bottle 11.

Heretofore when the level of the oil L—L within the oil trap 12 dropped below the opening of the reservoir outlet 13, oil would discharge from the oil reservoir 11 into oil trap 12, and air would enter reservoir outlet 13 accomplished by a very objectionable sound. This noise is quite annoying, especially if there is sickness in the house or if there are sleeping quarters nearby.

Our improved device comprises a bottle cap Figure 2, which is, in the case of an oil burner, screwed on to the neck of the bottle and takes the place of the usual bottle cap. The internal thread 14 is to attach the cap to the oil reservoir 11, an oil discharge pipe 18 extends downward with a groove 10 cut into its lower extension. A tubular wall 17 entirely surrounds the discharge pipe 18, which will, when the oil level L—L is maintained, partly cut off the atmospheric pressure from the groove 10. A small amount of air will enter the air chamber 23 through the comparatively small aperture 15.

21 is an annular cork washer or other suitable material interposed between the neck of the bottle and the seat at the bottom of the thread 14 which closes and seals the joint between the bottle neck and the cap. This washer 21 also acts as a seat for the poppet valve 20, which has a stem 19. When the bottle is removed from the trap for refilling purposes, spring 22 acts upon stem 19 to keep valve 20 seated to washer 21. The entire bottle cap Figure 2 is removed from the bottle when the bottle is refilled.

From the above descriptions it will be clear that in our improved device that the atmosphere can not rush into the oil delivery outlet 13, but will have to ooze through the small aperture 15 before it can go into the air chamber 23 and then through the aperture 10 in the oil discharge pipe to enter the bottle. This process will naturally take more time than an open outlet for the oil and will have the results of quieting or silencing the action of refilling and maintaining the level of the oil trap.

What we claim is:

1. A vacuum reservoir silencing device the combination of a cylindrical shell shaped body, said body having an air-tight upper end with a comparatively large inlet hole in the center and having an enclosed bottom end with a comparatively large outlet hole in the center and a comparatively small porthole situated in its sidewall; a pipe extending downward from said hole in said upper end and having an aperture in its side, said aperture being somewhat lower than the small porthole in the sidewall of the said shell shaped body; a valve device including a valve part adapted to close the opening through said pipe and having a stem protruding downward below the bottom of said shell shaped body, said stem being expanded at its lower end; a coiled spring interposed between the expanded end of said valve stem and the enclosed bottom end of said shell shaped body; a main liquid supply vessel whose only outlet is at the bottom, said outlet being hermetically sealed to the top end of said shell shaped body; a trap vessel for holding a body of liquid that is delivered by gravity into said trap vessel from said main liquid supply vessel and whose contents serve to normally close said outlet to the escape of liquid and to the entrance of air, said trap vessel cooperating with said shell shaped body and acting as a support and whose liquid contents is maintained to the height of said aperture in said pipe; means operable to empty said trap vessel of its liquid contents so that when the liquid in the trap vessel falls below the aperture in the pipe, air will enter the comparatively small porthole and enter the main liquid supply vessel through the aperture in the pipe.

2. A vacuum bottle silencer cap comprising a hollow shell shaped cylinder, said cylinder having an internally threaded portion upon its inner surface and having a partition in its lower end, said partition having a hole in its center; an air chamber hermetically sealed to the partition of said hollow shell and having a large opening in its bottom; a pipe located at the hole in the center of said partition and extending downward into said air chamber to about midway and a comparatively small orifice located in the side wall of said air chamber somewhat higher than the bottom level of said pipe.

FREDERICK J. HITCHCOCK.
GEORGE G. PERKINS.